(12) United States Patent
De Lima Barreto et al.

(10) Patent No.: US 11,897,803 B2
(45) Date of Patent: Feb. 13, 2024

(54) HYBRID SYSTEM FOR CONTAMINANTS CONTROL OF INDUSTRIAL PROCESS

(71) Applicant: Ricardo Reis De Carvalho, Valinhos (BR)

(72) Inventors: Ricardo De Lima Barreto, Valinhos-SP (BR); Ricardo Reis De Carvalho, Valinhos-SP (BR)

(73) Assignee: Ricardo Reis De Carvalho, São Paulo (BR)

( * ) Notice: Subject to any disclaimer, the term of this patent is extended or adjusted under 35 U.S.C. 154(b) by 18 days.

(21) Appl. No.: 17/165,379

(22) Filed: Feb. 2, 2021

(65) Prior Publication Data

US 2021/0238076 A1 Aug. 5, 2021

(51) Int. Cl.
*C02F 9/00* (2023.01)
*C02F 1/00* (2023.01)
(Continued)

(52) U.S. Cl.
CPC ............... *C02F 9/00* (2013.01); *C02F 1/008* (2013.01); *C02F 1/441* (2013.01); *C02F 1/444* (2013.01);
(Continued)

(58) Field of Classification Search
CPC .. C02F 9/00; C02F 1/008; C02F 1/441; C02F 1/444; C02F 1/04; C02F 1/72;
(Continued)

(56) References Cited

U.S. PATENT DOCUMENTS 3,568,847 A * 3/1971 Carr .................. B04C 5/12
  210/512.1
5,470,480 A * 11/1995 Gray .................. C02F 9/00
  210/759
(Continued)

FOREIGN PATENT DOCUMENTS

DE     4314521 A1 * 11/1994  ............. B01D 19/02
ES  2586427 T3 * 10/2016  ............. B08B 3/022
(Continued)

OTHER PUBLICATIONS

English Full Translation of Patent Document DE413521A1, Pfenning et al., published Nov. 1994. (Year: 1994).*
(Continued)

*Primary Examiner* — Joseph W Drodge
(74) *Attorney, Agent, or Firm* — JCIP; Joseph G. Chu; Jeremy I. Maynard (57) ABSTRACT

This Invention Patent application provides a comprehensive program for control of organic and inorganic contaminants from paper production processes and other potentially pollutant industries through the integrated action of three continuous treatment systems, referenced herein as "3WAY", with a first system aimed at the treatment of process waters for reuse, more specifically "white or clarified water" present in the "wet end" of paper and cellulose machines, allied to a second system based on the use of an adsorbent clay mix equipment that enables treatment of the cellulose pulp in previous phases of the process up to the machine circuit, in addition to a third system that carries out the cleaning of contaminant deposits present in clothing (felts and wires) or other machine parts through application of a heated and pressurized cleaning solution with a high detergency power.

4 Claims, 7 Drawing Sheets

(51) Int. Cl.
*C02F 1/44* (2023.01)
*C02F 1/04* (2023.01)
*C02F 1/72* (2023.01)
*C02F 101/30* (2006.01)
*C02F 103/00* (2006.01)
*C02F 103/28* (2006.01)

(52) U.S. Cl.
CPC .................................. *C02F 1/04* (2013.01); *C02F 1/72* (2013.01); *C02F 2101/308* (2013.01); *C02F 2103/002* (2013.01); *C02F 2103/28* (2013.01)

(58) Field of Classification Search
CPC .......... C02F 2101/308; C02F 2103/002; C02F 2103/28; C02F 2209/05; C02F 2209/055; C02F 2209/11; C02F 1/44; C02F 1/001; C02F 1/004; C02F 1/043; C02F 1/28; C02F 1/281; C02F 1/727; C02F 2103/26; C02F 2103/30; C02F 2209/005; C02F 2209/006; C02F 2209/08; C02F 1/02; C02F 1/34; C02F 1/38; C02F 1/68; C02F 1/685; C02F 1/687; C02F 1/725; D21C 9/08; D21C 5/005; D21C 11/00; D21C 11/0014; D21C 11/0021; D21F 1/32; D21H 17/005; D21H 17/68; D21H 21/02; G06F 30/27; G06N 5/022; G06N 20/00; G06Q 50/04; B01J 4/00; B01J 4/001
USPC .................. 162/14, 29, 41–45, 189
See application file for complete search history.

(56) References Cited

U.S. PATENT DOCUMENTS

| | | | | |
|---|---|---|---|---|
| 5,558,783 A * | 9/1996 | McGuinness | ........... | C02F 1/008 210/182 |
| 5,614,100 A * | 3/1997 | Gallup | ....................... | C02F 1/28 210/692 |
| 5,849,197 A * | 12/1998 | Taylor | ................ | D21C 11/0042 210/651 |
| 6,635,754 B1 * | 10/2003 | Oberkofler | ................ | D01F 2/06 162/182 |
| 2005/0045556 A1 * | 3/2005 | Kryzak | ................... | C02F 1/004 210/602 |
| 2006/0249464 A1 * | 11/2006 | Conger | ................. | B01J 8/0492 210/760 |
| 2007/0050157 A1 * | 3/2007 | Kahn | ...................... | C02F 1/008 702/55 |
| 2007/0109175 A1 * | 5/2007 | Fukuda | ..................... | G01S 7/36 342/134 |
| 2009/0267349 A1 * | 10/2009 | Spitzauer | ................. | C10L 1/04 44/313 |
| 2014/0069821 A1 * | 3/2014 | Marcin | .................. | C25B 15/00 204/240 |
| 2014/0332450 A1 * | 11/2014 | Wiemers | ................ | C02F 1/008 210/85 |
| 2016/0052798 A1 * | 2/2016 | Downs | .................... | B01J 49/75 210/85 |
| 2019/0225521 A1 * | 7/2019 | Heath | ....................... | C02F 1/48 |
| 2022/0058317 A1 * | 2/2022 | Reis De Carvalho | . | G06N 5/022 |

FOREIGN PATENT DOCUMENTS

| | | | | |
|---|---|---|---|---|
| KR | 100249489 B1 * | 3/2000 | ............... | C02F 1/72 |
| WO | WO2008012597 A1 * | 1/2008 | ............... | B08B 3/02 |
| WO | WO2009117073 A1 * | 9/2009 | ............... | C08K 1/00 |
| WO | WO2016120531 A1 * | 8/2016 | ............... | C02F 1/00 |

OTHER PUBLICATIONS

English Translation of Reis De Carvalho Patent Publication ES2586427T3, published Oct. 2016. (Year: 2016).*

English Translation of HAN et al Patent Publication KR100249489B1, published Mar. 2000. (Year: 2000).*

* cited by examiner

TABLE 1

| PARAMETERS | | | | RESULTS | | | |
|---|---|---|---|---|---|---|---|
| Aspects | | | | Oily dark mix with characteristic smell of oil compounds | | | |
| pH | | | | 10 | | | |
| Total phenols (mg/L) | | | | 1.000 - 2.000 | | | |
| Test | $H_2O$ 50% (g/L) | Additive (mg/L) | FENTOX® (mg/L) | Additive (g/L) | pH | Phenols (mg/L) | Efficiency (%) |
| White | - | - | - | - | 10 | 1.100 | - |
| Treated | 16 | 50 | 400 | 2,7 | 6 | 5 | 99 |

HYBRID SYSTEM FOR CONTAMINANTS CONTROL OF INDUSTRIAL PROCESS

FIELD OF APPLICATION

This Invention Patent application refers to a hybrid system referenced herein as "3WAY", which integrates three continuous treatment systems, comprehensively addressing the issue for controlling the process contaminants in paper and cellulose plants and other industrial processes in a comprehensive manner. The technology comprises chemical and mechanical methods, through treatment systems that control the "effect" and the "causes" for generation of organic and inorganic deposits, simultaneously acting in process waters, cellulose pulps and clothing or other machine parts, such as rolls, tanks, suction boxes, hoods, among others.

Preamble

This Invention Patent application provides a comprehensive program for control of organic and inorganic contaminants from paper production processes and other potentially pollutant industries through integrated action of three continuous treatment systems, referenced herein as "3WAY", with a first system aimed at the treatment of process waters for reuse, more specifically "white or clarified water" present in "wet end" of paper and cellulose machines, allied to a second system based on the use of an adsorbent clay mix equipment that enables treatment of the cellulose pulp in previous phases of the process up to the machine circuit, in addition to a third system that carries out the cleaning of contaminant deposits present in clothing (felts and wires) or other machine parts through application of a heated and pressurized cleaning solution with a higher detergent power.

The integrated action of said three treatment systems allows not only effective control of the contaminants in paper and cellulose plants and other industrial sectors, but also the larger closure of the water circuit due to continuous cleansing of the system, avoiding the overload of the Wastewater Treatment Plants and unnecessary consumption of water captured from rivers or from the public supply network.

This is a highly desirable aspect due to the trend observed in the last years of water shortage with the subsequent increase in collection and treatment costs. However, when the circuit is further closed, the aggravation of the deposit issue occurs due to the accumulation of process contaminants, such as pitch and stickies in the paper process, coming from natural wood resins and recycled fiber, respectively. In addition, in order to maintain productivity and quality levels of paper produced, the dosage of chemical additives, such as polymers and surfactants, is increased, this further boosting organic and inorganic solid contents that are dissolved or suspended in colloid state in the water medium.

It should be observed that the suspended macrometric solids (above 5 μm) are easily removed in the process by mechanical cleansing equipment, while suspended micrometric solids are usually attacked by the primary physicochemical treatment in Wastewater Treatment Plants, comprising pH adjustments, coagulation and flocculation. The bigger issue, therefore, is in recalcitrant (or non-biodegradable) dissolved organic solids such as, for example, lignin phenol derivatives, and inorganic solids dissolved such as the ion Ca2+, responsible for increased hardness and increasing quantities in "closed systems", with the aggravating factor of being complexed by organic anions that easily form deposits.

Therefore, the development and rational application of advanced treatment technologies that address the issue of organic and inorganic solids dissolved or suspended in colloid state in "complex residual currents" of the paper process and other industrial sectors, in an effective and economically feasible manner, is paramount. Said "currents" may be found in different positions of the process points, although one of the most problematic of the paper industry, under the viewpoint of this Invention Patent application, is the "white or clarified water" that circulates inside machines, being responsible for accumulation of deposits in felts and wires and other machine parts, negatively affecting productivity, vapor consumption and the quality of the paper sheet formed.

STATE OF THE ART

This Invention Patent application assumes the knowledge acquired in the aforementioned field, evidencing the most relevant technological advances in chemical and mechanic methods employed for attacking industrial process contaminants, with special mention to the pitch and stickies control in paper processes, which were strategically divided into three circumstances: 1) the machine circuit process waters; 2) the cellulose pulp in fiber lines and machine circuits; and 3) clothing (felts and wires) and machine parts.

Regarding treatment of process waters, in order to address the aforementioned issue of organic and inorganic contaminants dissolved or suspended in colloidal state in process waters, aiming at reuse, advanced treatment technologies must be applied, among which the importance of advanced oxidation and filtration-based technologies is attested, often with more than one associated technique.

Among other works on advanced filtration, Chinese patent CN101337750 deserves mention, which combines membrane techniques, such as ultrafiltration and reverse osmosis, to address usual contaminants of the paper production process: inorganic salts, chemical additives in excess, lignin, fibrils, hemicellulose, among others. The technological difference is in the methodologies used to avoid rapid clogging of the membranes, as well as microwave-based polishing of the "concentrated material" which is generated after reverse osmosis, capable of minimally legal attending it to disposal conditions.

Patent CN101781049 went further, associating the same advanced filtering strategy (ultrafiltration followed by reverse osmosis), but applying to the "concentrated current" a more robust oxidation process, firstly comprising a heterogeneous catalysis with ozone in an activated carbon surface, including, afterwards, the traditional Fenton reaction. Thus, the utilization level of reuse water significantly increases.

When searching for advanced treatment alternatives for reuse, patent CN103130370 identified an evaporation equipment based on the MVR—Mechanical Vapor Recompression method, which attests its usefulness in the dye sector for obtaining very high quality distilled water for reuse, in addition to the differential of utilizing the "concentrated material", in this case, to crystallize the solid residue, which may have a high aggregate value, containing materials such as ammonium sulphate and ammonium chloride.

Regarding the treatment of cellulose pulp, it is known by those skilled in the art that all organic contaminant control program, more specifically pitch and stickies in the paper production sector, must comprise a solid treatment strategy for the cellulose pulp, in order to inhibit the formation of deposits in the first phases of the paper and cellulose manufacturing process, either in the "fiber line" and in the "machine circuit". In this sense, different chemical methods and application processes are employed, with highlights to the strategies of dispersion, adsorption and microfixation which, ideally, must be associated.

The use of adsorbents combined with polymers, in a microparticle "dual system", is perhaps considered the most efficient strategy nowadays, since it is capable of attracting dissolved contaminants and in colloidal state, retaining said contaminants in a "masked" manner on the paper sheet and inhibiting adhesiveness (detacking), removing them from the water medium and simultaneously allowing the system to be "purged" without compromising productivity.

Usually talc is used as the "universal adsorbent"; however, an increasing trend in the use of other clays has been noticed, such as bentonite in slurry form, aiming at partial or full replacement, mainly due to the concerns related to human health, since talc has asbestos in its composition, which is a known carcinogenic substance. In this sense, more significant advances were identified in patent WO2009/117073, which comprises a mix of clays associated to a hydrophobic polymer, more particularly a modified cellulose ether-type biopolymer.

Regarding clothing treatment (felts and wires) and machine parts, it is of vital importance today to maintain productivity levels, production costs and quality of paper produced in paper production industries, particularly in face of current closure levels of the "water circuit", in which the contents of organic and inorganic contaminants dissolved or in colloidal state are increasing, causing increasing amounts of deposits, which compromise drainability and, consequently, the lifetime of felts and wires. On the other hand, more recent approaches found in the literature that innovate when approaching the issue of cleaning and conditioning involve mostly chemical and mechanical-chemical methods, although exclusively mechanic initiatives are also on the rise.

The exclusively mechanic approach is still restricted, but signals an important trend in the search for solutions more environmentally friendly, free when possible of the application of chemicals. In this sense, patent WO 2013/154802 (priority for U.S. 61/622,622) stands out, which proposes the use of continuous cleaning methods that apply vapor to heat and soften the contaminants on clothing, followed by application of heated water or, preferably, overheated water, through "encapsulated" pressurized showers to remove contaminants without affecting wetting.

Regarding the chemical and mechanical-chemical methods, the enzymatic application to felts should be mentioned (continuous or intermittent), pioneering in U.S. 60/395,528 and extended worldwide in WO 2004/007839, which then considers the degradation mechanisms of main substances that comprise the deposits, through the use of specific enzymes (e.g. Lipase acting on pitch resins) or a mix of enzymes such as amylase, proteases, xylanases, among others. The main goal is the reduction or even eradication of chemical cleaning in batches which end up reducing the useful lifetime of felts and screens.

Issues with the State of the Art

Technical limitations of works that have substantiated this invention proposal were also purposefully divided into the three treatment circumstances, namely:
Treatment of Process Waters:
Regarding advanced technologies aiming at the reuse of process waters in the paper production process, as well as other industry sectors, it was generally found that a single technique is unable to solve the issue for all types of contaminants, and often a combination of advanced filtration, oxidation and distillation techniques into a proper treatment sequence is required.

Regarding advanced filtration, patent CN101337750 has shown that the association between ultrafiltration and reverse osmosis is suitable to the specific characteristics of paper production process currents, although the permeate "concentrated material", which usually represents up to 30% of filtered volume, has been addressed with partial success through the microwave technique, only allowing legal framing for disposal, which significantly affects reuse rates.

Patent CN101781049, on the other hand, was more successful in this aspect when combining said advanced filtration with advanced oxidation techniques, more particularly ozone activated on a coal surface and the standard Fenton reaction, reaching up to 85% reuse rates in some cases. However, operational costs of this oxidation phase, for concentrated material volumes obtained, are high and may render most applications economically unfeasible.

Methods based on water distillation, such as MVR (Mechanical Vapor Recompression), featured in CN103130370, are still clearly in a preliminary stage of development, limited mainly because of the high energy consumption, which severely restricts industrial feasibility, more particularly to less water-heavy sectors, which is certainly not the case with the paper production industry and a few others (textile, sugar cane, etc.).
Treatment of Cellulose Pulp:

Despite the recent trend for replacing talc in treatment of cellulose pulp, systems comprising adsorbent microparticles are still the choice for obtaining more effective results in terms of inhibition of organic deposits, more specifically pitch and stickies, in paper production processes. Other technologies, such as use of enzymes, were tested, but did not reach the spotlight, working, at best, as a complementary strategy to dispersing agents, adsorbents, and fixative agents.

Regarding specifically the clay mix used in WO 2009/117073, the issue is that there was no novelty regarding the nature of clays used (bentonite, kaolin, etc.), and all of them are from the same chemical class as talc, in other words, polysilicates. Therefore, other possible synergistic effects are not explored with other clay types, and the limitation remains in applying said clays in combination with a polymer or biopolymer capable of providing organophilization.
Treatment of Machine Parts and Clothing:

Regarding the cleaning and mechanical conditioning technologies, despite the reports from patent WO 2013/154802 indicating that high pressure (between 20 and 55 bar) and temperature (between 100 and 135° C.) levels do not cause, or hasten, clothing wear (felts and screens), the real effectiveness of mechanic cleaning only with vapor and overheated water, once they suggest, simultaneously, eventual application of a "cleaning solution", conflicting as well with other preceding patents of this technique and the scope itself of said Invention Patent application.

Regarding the enzyme technology proposed in WO 2004/007839, in spite of the correct concept in terms of chemical functionality based on selective degradation of contaminants present in deposits, practice shows that the enzymatic activity is still insufficient to address, specifically, the dynamic imposed by the shortened residence time in felts and screens. In addition, there is always the concern to degrade other substances that are useful to the "paper chemistry", as well as the limitation of heated application, which fully or partially deactivates most of the enzymes, thus preventing any advance in applicability.

Based on the issues presented herein, and upon a detailed analysis taken to effect in order to propose the subject presented herein, none of the chemical and mechanical methods provided in the state of the art for control of contaminants in paper and cellulose plants and other industrial sectors conflict with the implementations described in this Invention Patent application.

Lastly, in face of the reach of patent surveys presented herein, no other processes related directly to the aforementioned subjects were found in the INPI archives, nor in the main patent offices around the world.

BRIEF DESCRIPTION OF THE INVENTION

As described in greater detail below, this Invention Patent application implements a "hybrid system" referenced herein as "SWAY", its use and method for control of contaminants in paper and cellulose plants and other industry sectors. Such system, in reality, is capable of integrating three continuous treatment systems:
Treatment of Process Waters;
Treatment of Cellulose Pulp;
Machine Parts and Clothing Treatment.

The synergistic integration of the aforementioned systems which substantiates this Invention Patent application, if compared to literature reports, provides ample benefits to the control of process contaminants, particularly the manufacturing of paper and cellulose and other industry sectors with a similar contamination "profile", as evidenced by the premises listed below:

Provides an effective program for control of industry process contaminants, with special mentions to the control of pitch and stickies in the paper production sector, inhibiting formation of organic and inorganic deposits on all phases of the production process;

Enables increase in machine productivity, decrease in vapor consumption and improvement in quality of paper produced, with less holes, spots, and a more uniform cross-sectional humidity profile;

Enables full or partial talc replacement by the application of a special mix of microparticles based on adsorbent clays, minimizing eventual risks to human health, and providing on-site organophilization;

Enables reaching a higher closure index of the "water circuit" by continuous system cleansing and increase of industrial freshwater makeup.

Avoids overloading the ETE, separating and addressing "complex residual currents" with excess of chemical additives in process waters, such as "white or clarified water" in paper and cellulose plants;

Provides high purity water for more refined applications, such as "DESMI" water for generation of vapor in boilers or at the chemical center for preparation of process additives that are sensitive to the diluent medium;

Flexibility in application of the hybrid system referenced herein as "3WAY", fully or partially in the modality referenced herein as "2WAY", in other industry sectors aside from the paper production sector, provided they have similar characteristics to the contaminants present in "complex currents" of residual process waters and that they may be separated and treated individually.

BRIEF DESCRIPTION OF THE DRAWINGS

This Invention Patent application shall be described in detail, referencing the drawings listed below, in which.

DETAILED DESCRIPTION OF THE INVENTION

Figure 1:
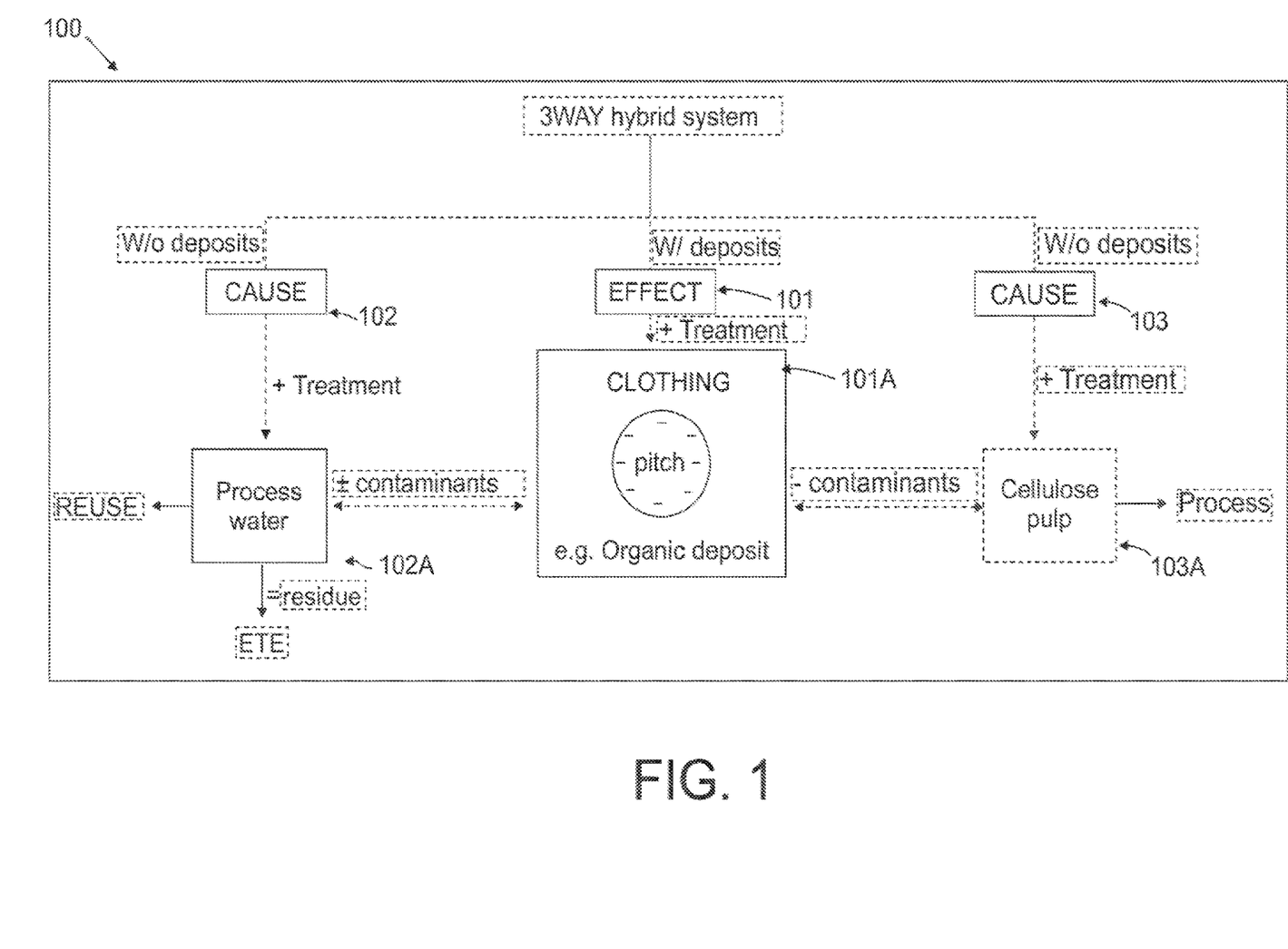
FIG. 1 shows the method 100 which is the core of the continuous chemical treatment for contaminants of paper production processes and explains the "hybrid system" concept referenced herein as "3WAY"

The core of this Invention Patent application, as shown in FIG. 1, is the integration of three treatment systems into a hybrid system referenced herein as "SWAY" in its fully assembled model, supporting the method 100 for continuous treatment that acts in synergy on the "effect" 101, in other words, when the deposits are already formed in different phases of the process, and accumulated on parts of the machine such as the clothing, as well as the "causes" 102 and 103 or, more particularly, before the agglomeration of dissolved or suspended contaminants in colloid state and formation of organic and inorganic deposits.

Following the concept proposed herein, the treatment system for clothing 101A acts upon the "EFFECT", removing deposits formed (e.g. pitch-type organic deposits) which are dispersed and stabilized in the water medium until finally discarded as liquid residue for the ETE. On the other hand, the process water treatment system 102A and the cellulose pulp treatment system 103A act upon the "causes", whereas the first removes and/or degrades contaminants, providing the reuse of water in the process and the second allows both the removal of contaminants and also their fixation to the cellulose fiber, therefore getting "carried" to the process with no collateral effects.

It should be noted that in a closed "water circuit" system, in which there is no system cleansing, new contaminants are constantly found, in addition to the concentration of additives through process waters, so that, for implementation of the chemical and mechanical strategy described herein, at least two integrated continuous treatment systems are required in the simplified "2WAY" model, always addressing the "effect" and a "cause", namely: treatment of machine parts and clothing 101A plus treatment of cellulose pulp 103A or treatment of machine parts and clothing 101A plus treatment of process waters 102A aiming at reuse.

In order to advance in the integration of the continuous treatment systems presented herein, the development of a more effective method for mapping and subsequent monitoring of contaminant levels in different phases of the process becomes a requirement, thus providing quick predictive analyses to aid in decision making on how to balance dosages of chemical additives and operation conditions between the systems in models referenced herein as "SWAY" or "2WAY".

Aware of the complexity of deposit composition and that the contaminants may spread in the dissolved and suspended phases in colloid state, before agglomerating and forming larger deposits (above 5 μm), depending on water medium conditions, pH variations, production recipe, temperature and pressure during the process, an initial mapping was devised at first with some "direct measurements" of relevant parameters, which are laborious and susceptible to human error, and afterwards correlate said measurements with "indirect measurements" which may be monitored with increased agility within the operational routine.

Figure 2:
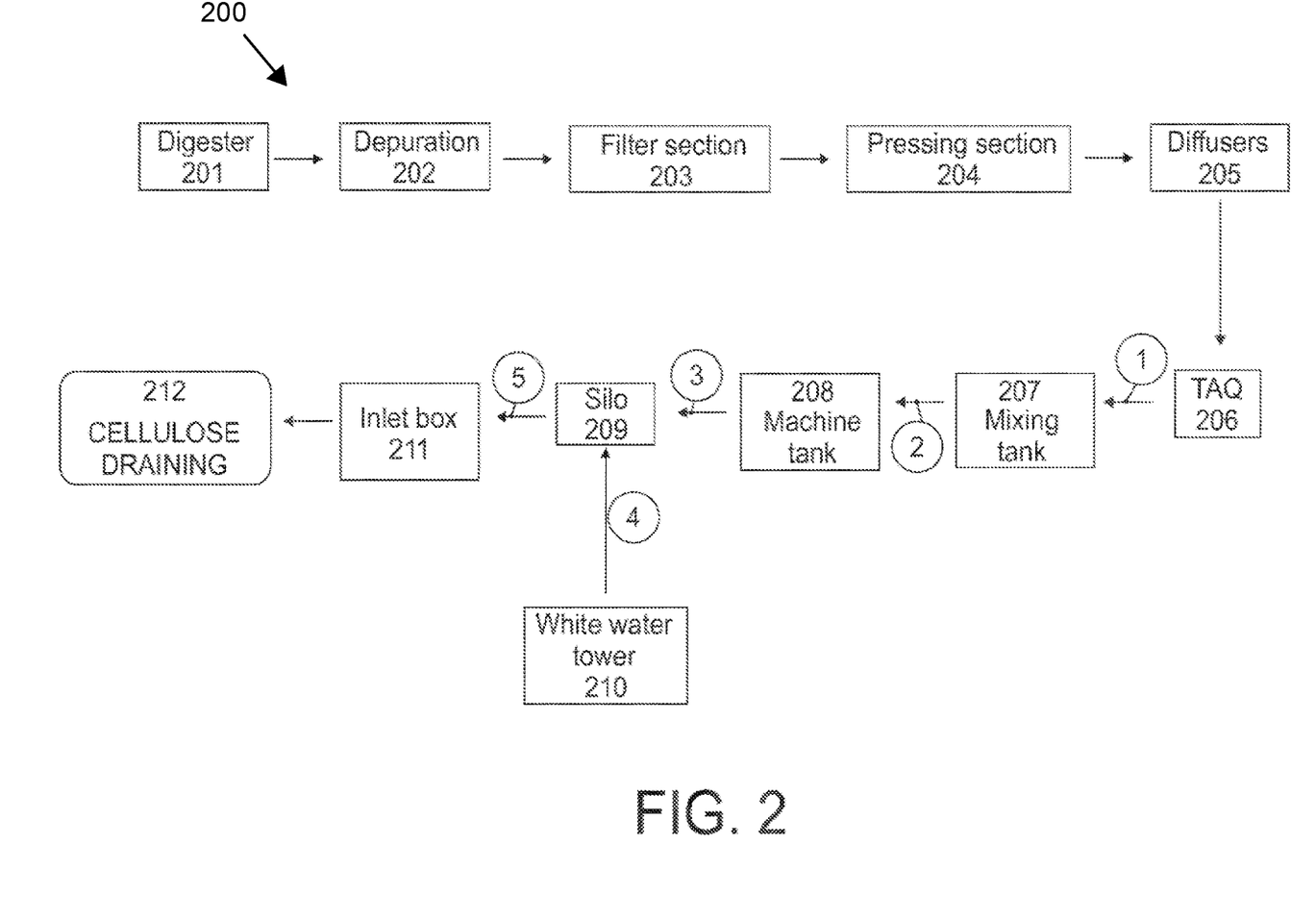
FIG. 2 shows a diagram of an example of the mapping of the standard industrial process for production of cellulose 200, comprising the respective characterizations and measurements in key points for control of contaminants.

FIG. 2 shows, for example, the initial mapping of a standard industrial process for production of cellulose 200, briefly involving the phases of wood digestion in a digester 201, depuration 202, filter section 203, pressing section 204 and diffusers 205, that comprise the "fiber line", followed by the "machine circuit", more precisely from the High Consistency Tank (TAC) 206, passing through the mixing tank 207 and the machine tank 208, then through the silo 209 and white water tower 210 until reaching, at last, the inlet box 211 that marks the entry into cellulose drainage machine 212.

This specific monitoring has concentrated the evaluation in the "machine circuit", comprising characterizations in five distinct points of the process, considered relevant to control of contaminants, in addition to the respective measurements of pH, hardness, conductivity, total solids, turbidity, color and contaminant count. In the aforementioned FIG. 2, the five machine points are indicated, respectively, by references 1, 2, 3, 4 and 5, related to which measured values of pH, hardness, contaminants, conductivity, total solids, turbidity and color are expressed, and it should be noted that measurement units for such parameters are featured in: pH, hardness (mg/L), contaminants (million cont./$cm^3$), Conductivity (μS/cm), total solids (%), turbidity (NTU) and color (mg PtCo/L).

In Point 1 it was obtained the following values: pH=9.96, hardness=60, Contaminants=119, Conductivity=1358, Total Solids=3.14, Turbidity=49 and Color=386; In Point 2 it was obtained the following values: pH=4.84, hardness=20, Contaminants=138, Conductivity=1240, Total Solids=2.45, Turbidity=54 and Color=427; In Point 3 it was obtained the following values: pH=4.86, hardness=40, Contaminants=127, Conductivity=1244, Total Solids=2.97, Turbidity=59 and Color=493; In Point 4 it was obtained the following values: pH=6.73, hardness=100, Contaminants=13, Conductivity=1071, Total Solids=0.07, Turbidity=16 and Color=132; and in Point 5 it was obtained the following values: pH=4.71, hardness=72, Contaminants=142, Conductivity=1257, Total Solids=2.07, Turbidity=59 and Color=451;

It should be observed, as an example of "direct measurement" specific for pitch and stickies-type suspended organic contaminants, microscopic count of the quantity of contaminants (expressed in million contaminants per $cm^3$), which may, in theory, be crossed with the "indirect measurement" for turbidity. Another important correlation, in this case for dissolved inorganic contaminants, would be the "direct measurement" for hardness expressed by the CaCO3 contents in solution (mg/L) versus the "indirect measurement" for conductivity expressed in μS/cm.

The fact is that this theoretical model has not been confirmed for the specific case of the correlation between turbidity and the microscopic count of suspended organic contaminants, as indicated by the measurements carried out on the same point only with samples collected in different days. In Point 5, for example, it was observed a discordant behavior from the contaminant count that increased from 48 to 282 million cont./$cm^3$ in two analysis rounds carried out in subsequent weeks, while turbidity remained mostly unchanged in the same period.

In this sense, this Invention Patent application considered the hypothesis that the "turbidity difference" (Δ NTU), before and after a pH "shock" (from 8 to 4, for example) would be a correlative measurement with the contaminant count (million cont./$cm^3$), since every chemical species susceptible to changes in solubility by the balance of protonated and de-protonated forms features a specific distribution between the dissolved and colloid phases, which, sometimes, may not affect the absolute value of each turbidity measure, but their differential.

Figure 3A:
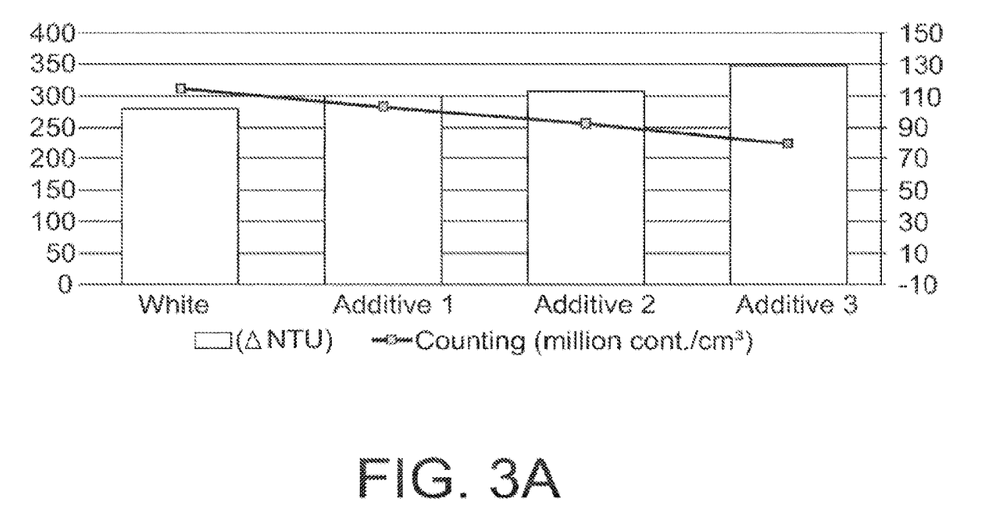
FIG. 3A shows a chart that evaluates different additives over a sample of cellulose pulp through measurement of the turbidity differential versus the contaminant count.
Figure 3B:
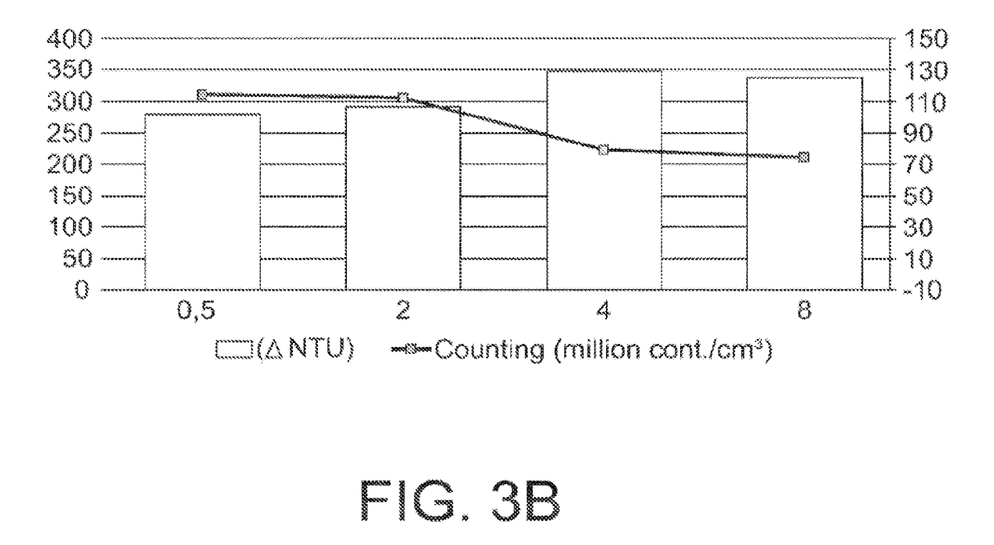
FIG. 3B shows a chart in which the concentration of one of the additives is varied for determining of the calibration curve.

In order to prove this hypothesis, experimental lab conditions were applied, initially evaluating (FIG. 3A) a battery with three different adsorbent additives over the sample cellulose pulp sample, confronting the turbidity differential measurement (Δ NTU) with the microscopic contaminant count (in million cont./cm3). Afterwards, the best result was selected (in this case additive 3) and the concentration was varied (in kg/t) in order to attest the falling trend in contaminant counting with the increase in turbidity differential, as per FIG. 3B for a wide range of concentrations, although a concentration threshold was hit above 4 kg/t. Therefore, after tracing a robust calibration curve (at least four points), it is perfectly possible to carry out coherent extrapolations on the contaminant level of a sample only through quick measurement of the turbidity differential (Δ NTU), largely facilitating the monitoring of process contaminants.

In possession of this methodology, it is possible to identify a sudden change in the level of organic contaminants right at the beginning of the process by the more significant variation of the turbidity differential (Δ NTU), due to factors such as change in wood composition, thus allowing an increase in dosages of pitch and stickies control additives inside the cellulose pulp treatment system 103A. If said variation spreads to points further ahead in the process, may also act upon the chemical strategy for the machine parts and clothing treatment system 101A, increasing the frequency of preventive shocks or dosage of continuous cleaning chemicals. Clearly, the same principle applies for detection of sudden variations in conductivity, although in this case the focus would be inorganic contaminants, such as calcium.

Afterwards, each one of the three continuous treatment systems that comprise this technological solution will be detailed, and may be comprised in the models referenced herein as "SWAY" or "2WAY" of the "hybrid system" for control of contaminants in paper production processes and other industry sectors.

Treatment of Process Waters:

The process water treatment system 102A aiming at reuse is characterized by using one or more advanced technologies, which are: filtration, oxidation and/or distillation. The focus lies in the treatment of "complex residual currents", which are usually generated in smaller volumes, below 100 $m^3$/h and ideally between 5 and 20 $m^3$/h. Said currents must be separated at the point of generation, prior to disposal to the Wastewater Treatment Plant, for potential reuse within the industrial process itself, such as "makeup" with industrial fresh water, important for closed "water circuit" system cleansing or even in applications that require water with high purity, such as "DESMI" water for generation of vapor in boilers or at the Chemicals Products Central for preparation of process additives sensitive to the diluent medium.

The segregation of these "complex residual currents" takes place through monitoring of certain physical, chemical, and biological parameters along a "decision tree", in which pollutants are firstly segmented between organic and inorganic, separated into dissolved or suspended in water medium. For dissolved organics, there is also the possibility that these are biodegradable or recalcitrant (non-biodegradable). For suspended pollutants, in general, the macrometric ones are separated from the micrometric ones by particle size, in other words, above or below 5 μm. This way, it is much easier to carry out the analysis of environmental parameters in the "currents", taking as a criterion, for example, the ratio between the Chemical Oxygen Demand and the Biochemical Oxygen Demand (COD/BOD), whereas if this ratio is higher than five, it indicates the recalcitrant nature of contaminants and, therefore, frames it as a "complex current" in which treatment is recommended through advanced oxidation processes that take place at the multioxidant reactor 102J and/or more recent solutions, such as advanced distillation of high energy efficiency, which occurs at the distilling unit 102G. For suspended micrometric pollutants (<5 μm), on the other hand, advanced membrane filtration techniques must potentially be employed, more particularly ultrafiltration followed by reverse osmosis which shall also be effective for dissolved inorganic pollutants and macromolecular dissolved organic pollutants (with molecular weight higher than 10 kDaltons). Some representative examples are shown below.

EXAMPLE 1. For a standard treatment situation with a "clarified water current" of a paper machine circuit, having elevated hardness and the presence of various dissolved and colloid contaminants, usually reference values are found in raw water for the main turbidity parameters lower than 100 NTU and hardness lower than 375 ppm of $CaCO_3$. DQO/DBO ratio amounts greatly oscillate, usually around 1.5 (e.g. 6,000/4,000 mg O2/liter), but may reach values above 5 (e.g. 10,000/2,000 mg O2/liter) according to the "water circuit" closure degree and the composition of specific current contaminants.

Figure 4:
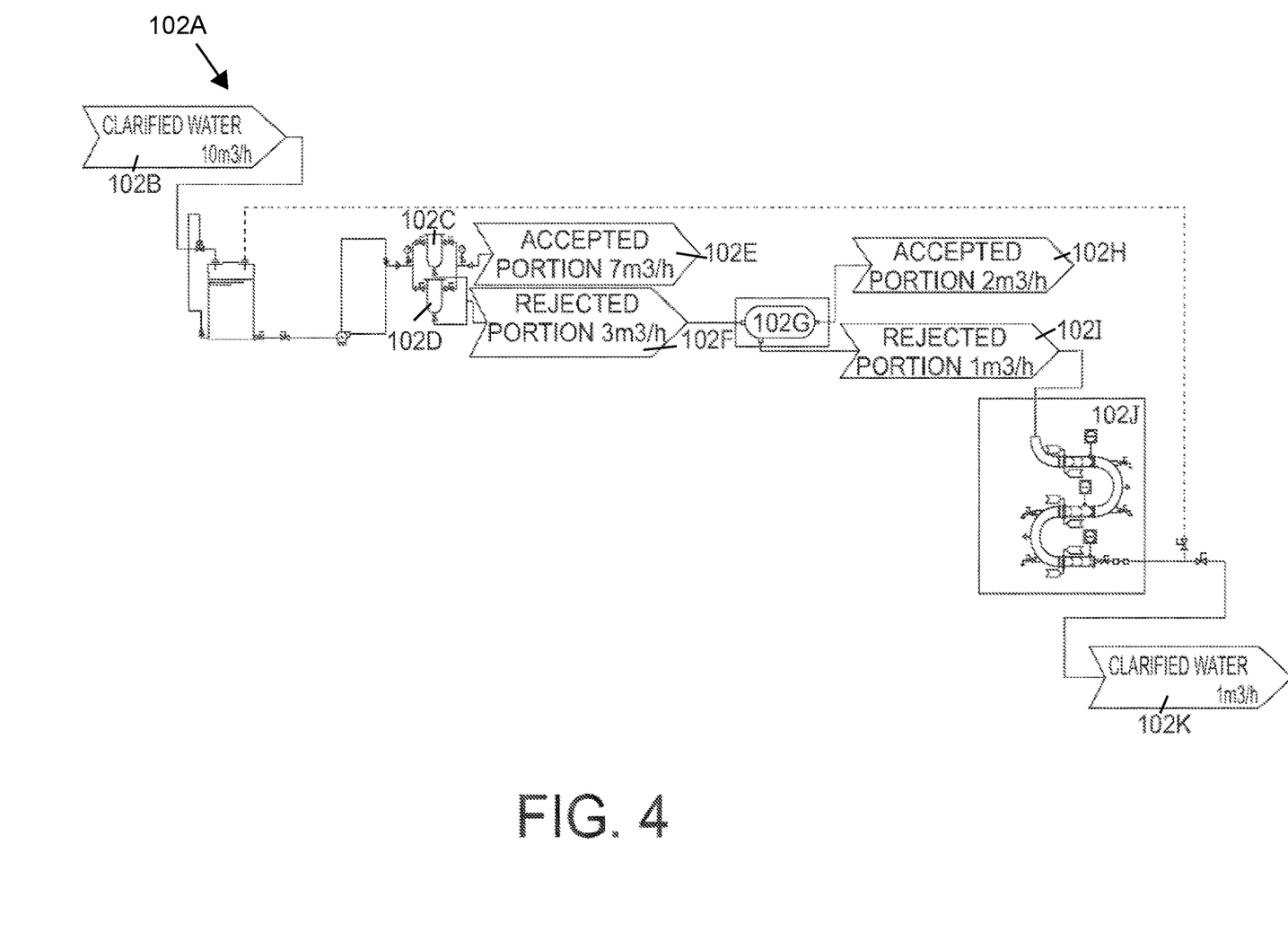
FIG. 4 shows a diagram that allows observation of the system 102A developed to treat a "clarified water" current under standard conditions found in the paper production sector through combination of advanced technologies aiming at reuse.

As provided in the diagram of FIG. 4, in face of the advancements already attained by our patent BR 102014022402-5 which approached the standard filtration processes associated to chemical adsorption techniques, this invention proposes initial treatment of "clarified water" 102B in a flow of 10 m3/h through a combination of two advanced membrane filtration techniques, more precisely ultrafiltration 102C followed by reverse osmosis 102D, attaining excellent results in treated water with turbidity values lower than 0.2 NTU and hardness lower than 0.5 mg/L of $CaCO_3$.

The "accepted portion" of this advanced filtering 102E (around 7 m3/h) may immediately be intended for reuse, while the "rejected portion" (approximately 3 m3/h), with a concentrated contaminant load, must proceed in treatment passing through an advanced distillation unit 102G which applies the concept patented in BR 102016010684-2 (extended internationally in WO2017193190 and licensed by us for industrial applications) which attains increased energy efficiency in heat exchange processes. Its "accepted portion" of approximately 2 m3/h, for instance, comprises high purity water, and may be used in more refined reuse applications, such as "DESMI" water for generation of vapor in boilers or in preparation of chemical additives sensitive to the diluent medium. The "rejected portion" 102I of 1 m3/h, even more concentrated in ionic charge and dissolved organic load, must undergo an advanced oxidation process inside a multioxidant reactor 102J, capable of degrading the residual organic load and also bring remaining ions to the higher oxidation stage, which normally are less toxic species (e.g. sulfide to sulphate). This clarified water (final treated water) 102K may then return to the start of the treatment system, and be released into the "water circuit" in recirculation or sent to the Wastewater Treatment Plant with no further impact to environmental control parameters.

EXAMPLE 2. As an example of application of treatment technology for process waters aiming at reuse in other industry sectors, more specifically the petrochemical sector which is considered one or the most pollutant, the treatment study is presented for a "phenolic current" (approximately 4 m3/day flow rate), arising out of drainage operations from gasoline processing and that must be separated in a tank for advanced treatment prior to disposal on the ETE, in face of the increased toxicity that affects the balance of biological treatment when phenol levels are found above 50 ppm, keeping in mind that it needs to be reduced below 5 ppm for legal attending within disposal standards.

Since it is a classic recalcitrant contaminant, which standard treatment methods have almost no effect on, the advanced oxidation process originally developed in our patent BR102013020206-1 was originally chosen as the technological solution, which makes use of pressurized redox systems. It should be noted that, in this specific case, both filtration and advanced distillation processes were not found effective due to specific properties of "phenolic currents", considered one of the most difficult to treat.

Figure 5A:
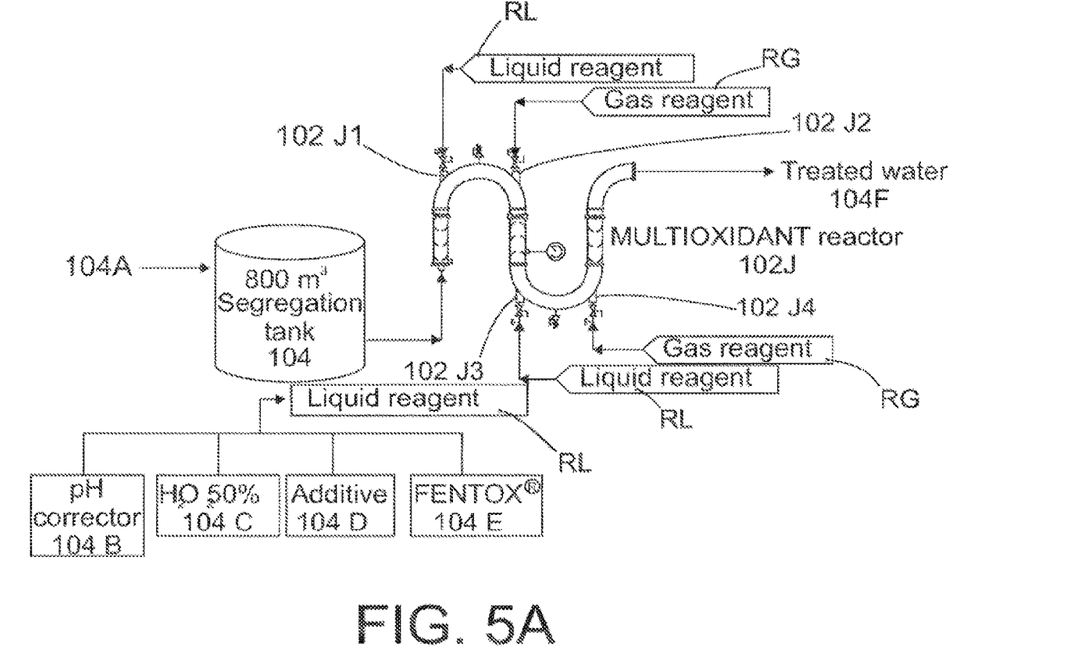
FIGS. 5A and 5B represent, respectively, the technological solution for treatment of residual water currents 104A coming from the petrochemical sector through an advanced oxidation process (diagram) and the respective table with the results obtained (Table 1)
Figure 5B:
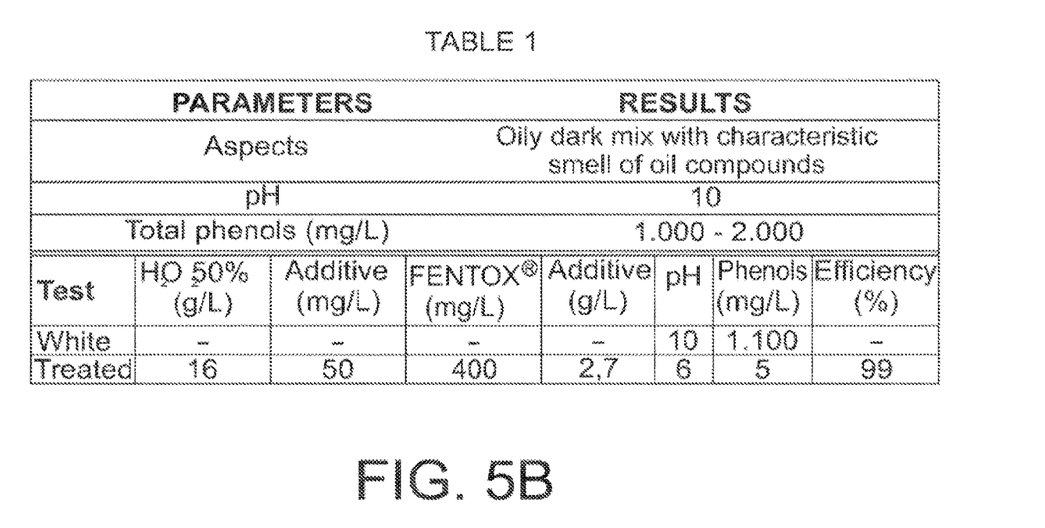

The technological solution found, as evidenced in the flowchart and figure table 5A and 5B, respectively, passes through the multioxidant reactor 102J which receives the raw "phenolic current" 104A coming from the segregation tank 104 with up to 800 m³ and combines liquid and/or gas reagents depending on the situation. In this case, only liquid reagents were employed, more particularly the pH corrector 104B in a 2.7 g/L concentration and the oxidizing systems 104C ($H_2O_2$ 50%), 104D (additive) and 104E(FENTOX®), more specifically 16 g/L of a $H_2O_2$ 50% solution, specific dispersant additive and household catalyst FENTOX® in 50 and 400 mg/L concentrations, respectively. The result is a treated water 104F with pH of 6 and phenol reduction of 99% efficiency, rated as lower than 5 ppm that allows reuse even for some specific applications within the petrochemical process. In aforementioned FIG. 5A, several inlets are indicated for the multioxidant reactor 102J, referenced as 102J1 (for admission of liquid reagent—RL), 102J2 (for admission of gas reagent—RG), 102J3 (for admission of liquid reagent (RL)) and 102J4 (for admission of gas reagent (RG)).

Obviously, to those skilled in the advanced treatment technologies presented herein, the applicability of the process water treatment system 102A is hereby explained, combined to other continuous treatment systems in the models referenced herein as "SWAY" or "2WAY", focused on separation of "complex residual currents", with treatment characteristics similar to the examples treated herein, and various industrial sectors in addition to the paper production sector, such as the chemical industry, textile, tannery, food industry, animal protein industry, pharmochemical, pharmachemistry, sugar cane, steelworks, metalworks, mining, remediation industries, oil and gas, among others.

Treatment of Cellulose Pulp:

The cellulose pulp treatment system 103A, on the other hand, is essentially characterized by the application of a new clay mix composition, no longer restricted to polysilicates (e.g. talc for pitch control), combining natural and synthetic microparticles in different proportions, more specifically bentonite and hydrotalcite, which have complementary and synergistic adsorbent properties.

Figure 6:
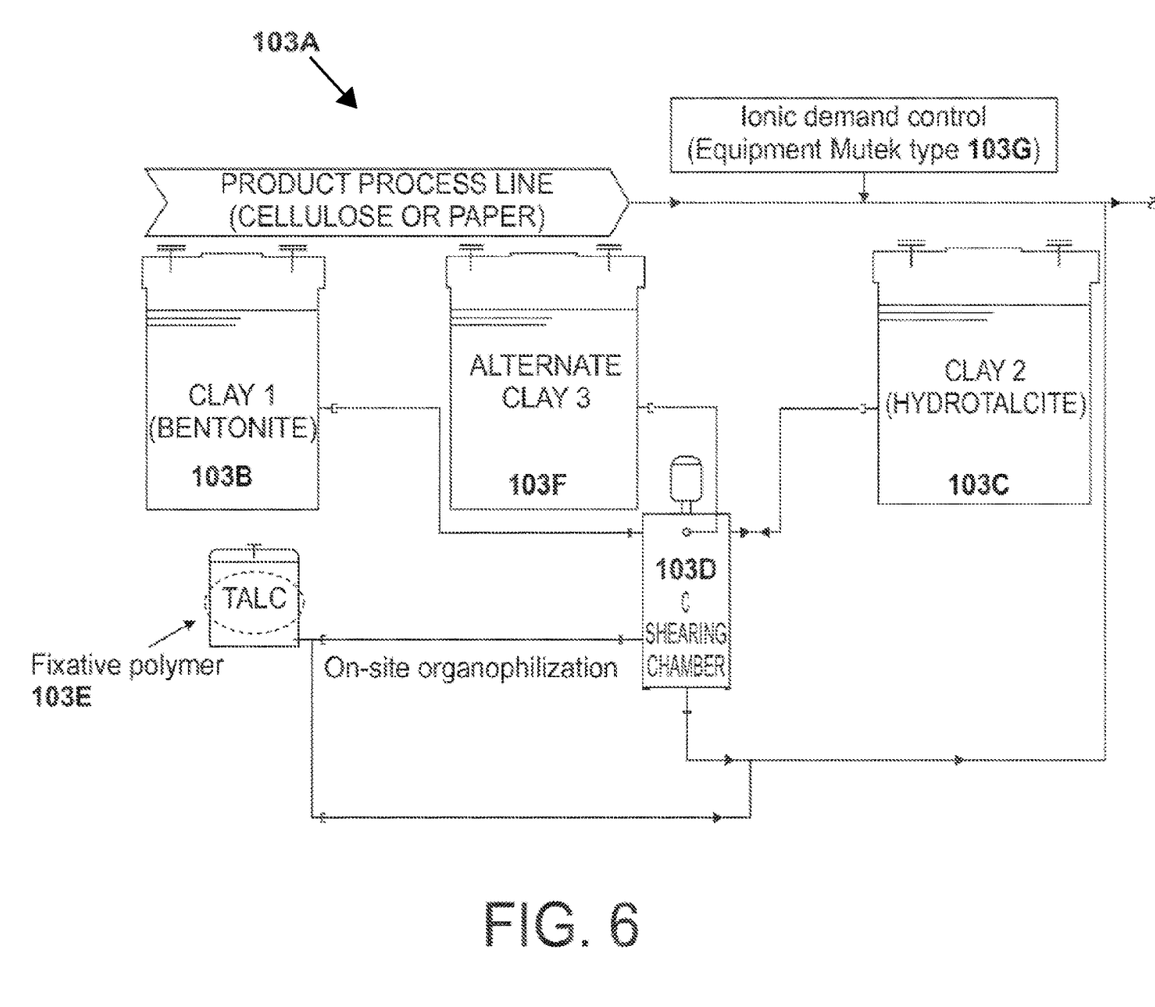
FIG. 6 shows the summarized flowchart of the treatment system of the cellulose pulp 103A; and Lastly.

Such clays are applied as slurries with a high degree of solids and passing through a thermodynamic equipment such as a shearing chamber 103D recently patented by us in BR 10 2019 024382-1, focused in the replacement of talc in paper production processes, which provides better homogenization and friction between the clay slurries, with the spontaneous increase in pressure and temperature, thus maximizing the clay "delamination" process with subsequent increase of surface area and adsorption sites which incorporate the contaminants. In addition, the equipment enables synergistic action of adsorbent clays 103B "Clay 1"—(Bentonite), 103C "Clay 2"—(Hydrotalcite) and 103F "Clay 3" (other chemicals) with the fixative polymer 103E, providing on-site organophilization without degrading the structure of polymeric chains, which enhances "detackifying" effects and attachment of the contaminants to the fiber.

A key aspect of this application, in order to provide better integration between systems in the models referenced herein as "SWAY" and "2WAY" lies in the monitoring of ionic demand at the point where the mix of slurries will be applied. It is known that the balance of electric charges, more specifically the presence of "anion trash" in suspended the cellulose pulp, has a vital role in the performance of various additives, particularly over cation adsorbents and polymers used herein. Usually, even greater care must be taken when finding anion demands above 100 mV or below 50 mV.

Therefore, this Invention Patent application comprises periodic control of ionic demand in mV (direct measurement) at the point of application through a MUTEK® equipment 103G, in addition to the correspondence with the "indirect measurement" of conductivity ($\mu$S/cm), as seen before, serving as predictive analysis for abnormal process situations, to aid in decision making regarding changes in application strategy of the system such as, for example, a correction at the dosage level of clay slurries and polymers at the entrance of the shearing chamber 103D, aiming to provide contrast to an eventual overload of "anionic trash".

FIG. 6 shows the summarized flowchart of the cellulose pulp treatment system 103A, added to the paper or cellulose production line, which provides the natural 103B and synthetic 103C clay mix (e.g. bentonite and hydrotalcite) through the aforementioned thermodynamic equipment 103D. On-site organophilization of clays is carried out by simultaneously adding the fixative polymer 103E which may enter the talc location, in an independent chamber section or replacing the third clay 103F which is optional.

Figure 7:
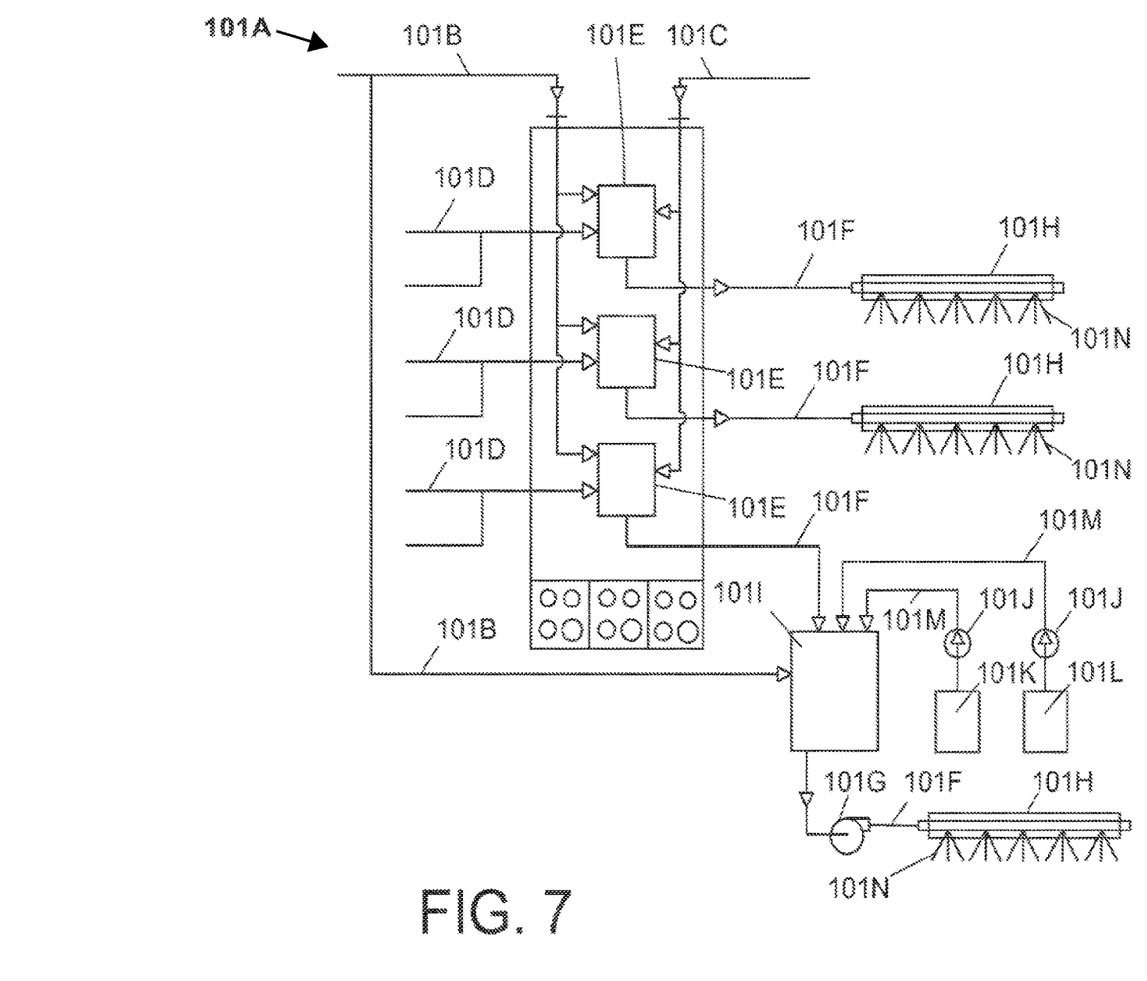
FIG. 7 shows a schematic view of the most important set of equipment that comprise the machine parts and clothing treatment system.

As already emphasized elsewhere, it should be noted that the model referenced herein as "2WAY", preferred by this Invention Patent application, provides integration of said cellulose pulp treatment system 103A with the clothing treatment system 101A, thus acting simultaneously on the "cause" and the "effect" of the presence of contaminants in distinct points of the process, in other words, back at the beginning of the process, either in the "fiber line" or in the "machine circuits", as well as further in the process, more particularly in paper and cellulose machines. Machine parts and clothing Treatment:

Lastly, the continuous chemical treatment system of machine parts and clothing 101A a thermodynamic equipment such as an injecting heat pump or heat exchanger 101E type that combines water 101B, vapor 101C and chemicals 101D to produce an "active solution" 101F with a high contaminant cleaning power, with benefits to the productivity in paper and cellulose manufacturing machines evidenced in our first patent PI 9715083-5, which received an important amendment in PI 0503029-3 and was internationally extended in WO 2008/012597.

In general, the main advances were the provision of two or more thermodynamic equipment working in parallel, providing "individual" treatment of clothing, an important innovation for simultaneously addressing various felts and wires with different control conditions, such as temperature, pressure, chemical dosage, among others. Therefore, each clothing has a "customized" treatment due to its unique compaction characteristics and useful life, allowing the reduction of chemical consumption to use only the required amount for cleaning each one.

Other important innovations added were the use of double-body showers 101H that allow drawing the inner part for cleaning the nozzles 101N without affecting machine productivity and quality of the formed paper sheet, as well as the introduction of a kit comprising a set of equipment allocated in an intermediate strategic position that allows abatement of temperature and pressure to levels between 40 and 60° C. and 1 to 6 bar, respectively. In such condition, the system is flexible for eventual applications of sensitive chemical products such as some enzymatic or polymeric ones in different machine points.

FIG. 7 shows a schematic view of the most important set of equipment that comprise the machine parts and clothing treatment system 101A, with particular attention to the fresh water feeding line 101B, the vapor line 101C, continuous use or shock treatment chemicals feeding line 101D, injecting heat pumps or heat exchangers 101E, keeping in mind that these are always combined in parallel to allow "individual" treatment of the felts and wires, or any machine parts to which the "pressurized chemical solution" 101F is applied, which is transported through an elevation and pressure maintenance pump 101G up to the double-body showers 101H. Additionally, the pressure and temperature reduction tank 101I and a series of peripherals may be found, that enable application of polymeric and enzymatic products, which are: dosage pumps 101J, chemicals 101K and enzyme 101L storage containers, as well as two pipelines 101M transported to the tank 101I.

In order to facilitate the integration between systems in models referenced herein as "SWAY" or "2WAY", this Invention Patent application provides the application of the concept of Internet of Things—IoT to all continuous process water treatment systems 102A, cellulose pulp treatment systems 103A and machine parts and clothing treatment system 101A, thus allowing data collection, analysis and generation of real-time information, using methods comprising big data, artificial intelligence, machine learning, recommendation algorithms, among others, which are key for quick decision making regarding application processes, more particularly the optimization of application parameters to identify eventual mechanical or chemical strategy flaws, in addition to predictive or automatic corrective interventions on dosages, application points, product exchange, among other functions. Such advances not only enable better integration between systems, but also important aspects for industries in general, which are: better process control, increase in productivity and reduction in consumption of chemicals.

Lastly, in face of the advancements presented herein, despite particular implementations described and detailed herein, this invention priority Patent application must not be considered as limited to such descriptions. It should, likewise, be evident to those skilled in the various arts involved that any changes, apparent or otherwise, may be incorporated as an integral part of this invention and yet remain in compliance with the scope of the following claims.

The invention claimed is:

1. "HYBRID SYSTEM FOR CONTAMINANTS CONTROL OF INDUSTRIAL PROCESS" comprising three integrally-controlled contaminant control systems, comprising a clothing and machine parts utilized in clothing treatment cleaning system including a thermal injector pump for injecting material for cleaning contaminants from the clothing and machine parts, a process water treatment system including an oxidative reactor for removing contaminants from water utilized in the cleaning system, and a cellulosic pulp treatment system including a shear chamber, provided with adsorbent clay, for treating cellulosic pulp from said clothing and machine parts.

2. "HYBRID SYSTEM FOR CONTAMINANTS CONTROL OF INDUSTRIAL PROCESS", according to claim 1, wherein said oxidative reactor includes a reagent capable of degrading organic load of the water.

3. "HYBRID SYSTEM FOR CONTAMINANTS CONTROL OF INDUSTRIAL PROCESS", according to claim 1, wherein the shear chamber provided clay comprises bentonite clay and a hydrotalcite clay.

4. "HYBRID SYSTEM FOR CONTAMINANTS CONTROL OF INDUSTRIAL PROCESS", according to claim 1, wherein the clothing and machine parts treatment cleaning system includes thermodynamic equipment comprising the thermal injector pump and further comprising a diffuser that combines fresh water, steam and products chemicals capable of producing a heated and pressurized chemical solution at pressures between 7 and 35 kgf/cm and temperatures between 70 and 99° C.

\* \* \* \* \*